(12) United States Patent
Park

(10) Patent No.: US 11,027,375 B2
(45) Date of Patent: Jun. 8, 2021

(54) AUTOMATIC AND MANUAL WELDING APPARATUS

(71) Applicant: Seon Geun Park, Seoul (KR)

(72) Inventor: Seon Geun Park, Seoul (KR)

( * ) Notice: Subject to any disclaimer, the term of this patent is extended or adjusted under 35 U.S.C. 154(b) by 104 days.

(21) Appl. No.: 16/609,335

(22) PCT Filed: Feb. 11, 2019

(86) PCT No.: PCT/KR2019/001641
§ 371 (c)(1),
(2) Date: Oct. 29, 2019

(87) PCT Pub. No.: WO2019/172540
PCT Pub. Date: Sep. 12, 2019

(65) Prior Publication Data
US 2020/0047292 A1    Feb. 13, 2020

(30) Foreign Application Priority Data
Mar. 8, 2018 (KR) ........................ 10-2018-0027199

(51) Int. Cl.
*B23K 37/04* (2006.01)
*B23K 37/02* (2006.01)
(Continued)

(52) U.S. Cl.
CPC .......... *B23K 37/0258* (2013.01); *B23K 5/006* (2013.01); *B23K 5/22* (2013.01);
(Continued)

(58) Field of Classification Search
CPC ...... B23K 37/0258; B23K 5/006; B23K 5/22; B23K 37/0247; B23K 37/0443; B23K 37/0461; B23K 5/02
See application file for complete search history.

(56) References Cited

U.S. PATENT DOCUMENTS 4,380,174 A * 4/1983 Tanenbaum ......... B23K 11/002
73/842
4,408,115 A * 10/1983 Tanenbaum ......... B23K 11/008
219/108

(Continued)

FOREIGN PATENT DOCUMENTS

JP    07-060488 A    3/1995
KR    10-0653022 B1    11/2006
(Continued)

*Primary Examiner* — Kiley S Stoner
(74) *Attorney, Agent, or Firm* — Novick, Kim & Lee, PLLC; Jae Youn Kim

(57) ABSTRACT

An automatic and manual welding apparatus includes an operation changeover switch which is provided to be capable of switching a manual input mode for switching off power supplied to an infeed motor to and from an automatic input mode for applying power supplied to the infeed motor, so as to switch the rotation of the infeed motor automatically and manually. A control unit controls the infeed motor such that the power supplied to the forward and backward transfer motor is switched off when the input of the operation changeover switch is in a manual input mode and the power to the infeed motor is applied when the input of the operation changeover switch is in an automatic input mode.

2 Claims, 6 Drawing Sheets

(51) Int. Cl.
*B23K 5/00* (2006.01)
*B23K 5/22* (2006.01)

(52) U.S. Cl.
CPC ...... *B23K 37/0247* (2013.01); *B23K 37/0443* (2013.01); *B23K 37/0461* (2013.01)

(56) References Cited

U.S. PATENT DOCUMENTS

| | | | | |
|---|---|---|---|---|
| 4,870,247 | A * | 9/1989 | Fukuoka | B23K 9/0216 219/125.1 |
| 5,672,283 | A * | 9/1997 | Wall | B21F 27/127 140/112 |
| 6,750,418 | B1 * | 6/2004 | Nastasi, Jr. | B23K 11/252 219/109 |
| 2004/0217091 | A1 * | 11/2004 | Schmidt | B23K 9/1056 219/98 |
| 2018/0085817 | A1 * | 3/2018 | Barozzi | B65H 81/06 |
| 2019/0321924 | A1 * | 10/2019 | Lin | B23K 31/02 |
| 2020/0030919 | A1 * | 1/2020 | Svedlund | B23K 9/282 |

FOREIGN PATENT DOCUMENTS

| | | |
|---|---|---|
| KR | 20-2012-0003121 U | 5/2012 |
| KR | 10-1616340 B1 | 4/2016 |
| KR | 10-1822339 B1 | 1/2018 |

* cited by examiner

AUTOMATIC AND MANUAL WELDING APPARATUS

TECHNICAL FIELD

The present invention relates to a welding apparatus, and more particularly to an automatic-manual welding apparatus for welding a die-board blade for use in a die-board in an automatic or manual manner.

BACKGROUND ART

In general, a die-board is called a wooden die, a Thomson die, or a blade die.

A die-board includes a supporting plate, and further includes a plurality of Thomson blades and a plurality of punches, which are coupled to the supporting plate. The supporting plate is made of steel, wood, resin, or the like, and is subjected to a laser or SCSI cutting process so as to have a predetermined pattern therein. The Thomson blades are fabricated via cutting and bending processes using a cutting machine and a bending machine, and are press-fitted, along with punches, in the predetermined pattern formed in the supporting plate in various arrangements.

A die-board blade for use in a die-board is formed in the shape of a plate having a predetermined length, and, as described above, is cut or bent in the shape of a groove corresponding to the predetermined pattern using a cutting machine, a bending machine, or the like. Two ends of the plate bent in a predetermined shape need to be brought into contact with each other and fixed to each other. To this end, the two ends of the plate are welded to each other while contacting each other.

A die-board blade may be manually welded by a skilled worker who specializes in welding. Therefore, the use of automatic welding apparatuses is gradually increasing with a decrease in the number of skilled workers. However, most automatic welding apparatuses are mainly used for the production of hulls of ships, bodies of vehicles, or the like, or the production of large-sized materials such as metal panels or pipes, and thus are not suitable for welding a Thomson blade having a small size or a precise shape.

As technology for solving this problem, there is Korean Patent Registration No. 10-1616340 entitled "Automatic Welding Apparatus for Welding Die-board Blade", which was filed by the present applicant.

In order to realize welding using the conventional automatic welding apparatus for welding a die-board blade disclosed in the above document, a die-board blade needs to be fixed to the apparatus. However, a worker needs to use the worker's hands and feet together in order to fix a die-board blade to the conventional automatic welding apparatus for welding a die-board blade. Thus, there is a problem in that an operation mistake may occur when the worker is distracted.

DISCLOSURE

Technical Problem

Therefore, the present invention has been made in view of the above problems, and it is an object of the present invention to provide an automatic-manual welding apparatus enabling performance of a welding process in an automatic input mode, in which the entire process of welding an object to be welded is automatically performed, or performance of a precise welding process in a manual input mode in response to a welding signal that is applied.

Technical Solution

In accordance with an embodiment of the present invention, the above objects can be accomplished by the provision of an automatic-manual welding apparatus including a welding table including a first table and a second table spaced a predetermined distance apart from each other, with a welding space formed therebetween, a workpiece-fixing unit movably provided at the first table and the second table, the workpiece-fixing unit being configured to fix an object to be welded, a welding unit provided at the second table, the welding unit including a welding torch configured to weld an object to be welded fixed by the workpiece-fixing unit, a vertical welding-unit-transferring unit configured to move the welding unit in a vertical direction with respect to a top surface of the second table, a horizontal welding-unit-transferring unit provided on the top surface of the second table, the horizontal welding-unit-transferring unit being configured to move the vertical welding-unit-transferring unit in a forward-and-backward direction with respect to the welding space, a welding gas supply unit configured to supply a welding gas to the welding torch, an input unit configured to selectively receive a power supply signal, a driving signal, and a welding signal associated with the workpiece-fixing unit, the welding unit, the vertical welding-unit-transferring unit, the horizontal welding-unit-transferring unit, and the welding gas supply unit, and a controller configured to, upon receiving a welding signal from the input unit, control the welding unit, the vertical welding-unit-transferring unit, the welding gas supply unit, and the horizontal welding-unit-transferring unit such that the welding torch welds the object to be welded while moving a predetermined welding distance forwards and backwards. The horizontal welding-unit-transferring unit includes a forward/backward transfer motor configured to be rotatable in forward and reverse directions, a forward/backward transfer screw coupled at a first end portion thereof to the forward/backward transfer motor, the forward/backward transfer screw being configured to be rotated in forward and reverse directions together with the forward/backward transfer motor, a forward/backward transfer screw support block configured to rotatably support the forward/backward transfer screw, a forward/backward welding-unit-transferring guide connected to the forward/backward transfer screw and the vertical welding-unit-transferring unit, the forward/backward welding-unit-transferring guide being configured to move the welding unit forwards and backwards in accordance with rotation of the forward/backward transfer screw in forward and reverse directions, and a manual operation handle coupled to a second end portion of the forward/backward transfer screw, the manual operation handle being configured to manually rotate the forward/backward transfer screw. The input unit includes an operation changeover switch configured to switch between a manual input mode, in which supply of power to the forward/backward transfer motor is interrupted, and an automatic input mode, in which supply of power to the forward/backward transfer motor is allowed, the operation changeover switch switching between a mode of automatically rotating the forward/backward transfer screw and a mode of manually rotating the forward/backward transfer screw. The controller controls the forward/backward transfer motor such that when the manual input mode is selected through the operation changeover switch, supply of power to the forward/backward transfer motor is interrupted and such that when the automatic input mode is selected through the operation changeover switch, supply of power to the forward/backward transfer motor is allowed.

In accordance with another embodiment of the present invention, the automatic-manual welding apparatus may further include a manual operation handle rotation control member configured to set an angle at which the manual operation handle is rotated to move the welding unit forwards and backwards. The manual operation handle may include a handle part, a coupling shaft extending from a center portion of the handle part, the coupling shaft being coupled to the forward/backward transfer screw, a first rotation control ball provided on a surface of the handle part to which the coupling shaft is connected, and a second rotation control ball disposed below the first rotation control ball while being spaced a predetermined distance apart from the first rotation control ball. The manual operation handle rotation control member may include a rotation control plate case having an inner space formed therein, the rotation control plate case including an open portion communicating with the inner space, a center portion of a surface of the rotation control plate case that is opposite the open portion being coupled to the coupling shaft such that the open portion is opposite the handle part, a first rotation control member accommodated in the inner space in the rotation control plate case, the first rotation control member being configured to rotate the manual operation handle 360 degrees in a forward direction or in a reverse direction when each welding process is performed on the object to be welded, and a second rotation control member accommodated in the inner space in the rotation control plate case, the second rotation control member being configured to rotate the manual operation handle a predetermined angle smaller than 360 degrees in a forward direction or in a reverse direction in the state of dividing 360 degrees into predetermined angular intervals when each welding process is performed on the object to be welded.

In the embodiment, the rotation control plate case may include a handle guide slot formed in a side surface portion thereof in a depth direction of the inner space therein and a handle guide cylinder protruding from an outer side of a surface thereof that is opposite the open portion, the handle guide cylinder extending in the depth direction of the inner space therein, the handle guide cylinder being formed to be hollow. The first rotation control member may include a first rotation control plate having a ring shape and a thickness less than or equal to half a depth of the inner space in the rotation control plate case, the first rotation control plate being accommodated in the inner space in the rotation control plate case, the first rotation control plate including a first rotation stop control recess formed in a surface thereof that is opposite the handle part to allow the first rotation control ball to be received therein and a first position fixing recess formed in a peripheral surface thereof defining the thickness thereof, a first control plate handle protruding from the peripheral surface of the first rotation control plate to be fitted into the handle guide slot, the first control plate handle being exposed outside the rotation control plate case through the handle guide slot, the first control plate handle being operated to move the first rotation control plate in the depth direction of the inner space in the rotation control plate case, a plurality of first control plate position fixing members coupled to two opposite sides of a side surface portion of the rotation control plate case, each of the first control plate position fixing members including a first position fixing ball partially protruding into the inner space in the rotation control plate case, the first position fixing ball being located in the first position fixing recess and elastically supported thereby when the first rotation control plate moves close to the handle part, and a plurality of second control plate position fixing members coupled to the side surface portion of the rotation control plate case so as to be adjacent to the first control plate position fixing members, each of the second control plate position fixing members including a second position fixing ball partially protruding into the inner space in the rotation control plate case, the second position fixing ball being located in the first position fixing recess and elastically supported thereby when the first rotation control plate moves away from the handle part. The second rotation control member may include a second rotation control plate having a thickness less than or equal to the thickness of the first rotation control plate and a size accommodated in an annular-shaped inner space in the first rotation control plate, the second rotation control plate being accommodated in the inner space in the rotation control plate case so as to be disposed at a position at which the second rotation control plate moves and passes through the annular-shaped inner space in the first rotation control plate, the second rotation control plate including a plurality of second rotation stop control recesses formed in a surface thereof that is opposite the handle part so as to be disposed in a rotating direction of the manual operation handle and to allow the second rotation control ball to be received therein, a second control plate handle protruding in a columnar shape from an opposite surface to a surface of the second rotation control plate that faces the handle part and passing through the handle guide cylinder so as to be exposed outside the rotation control plate case, the second control plate handle including a second position fixing recess disposed in a longitudinal direction of the columnar shape, the second control plate handle being operated such that the second rotation control plate is moved in the depth direction of the inner space in the rotation control plate case, a third control plate position fixing member coupled to one side of a side surface portion of the handle guide cylinder, the third control plate position fixing member including a third position fixing ball partially protruding into an inner space in the handle guide cylinder, the third position fixing ball being located in the second position fixing recess and elastically supported thereby when the second rotation control plate moves close to the handle part, and a fourth control plate position fixing member coupled to the side surface portion of the handle guide cylinder so as to be adjacent to the third control plate position fixing member, the fourth control plate position fixing member including a fourth position fixing ball partially protruding into the inner space in the handle guide cylinder, the fourth position fixing ball being located in the second position fixing recess and elastically supported thereby when the second rotation control plate moves away from the handle part.

Advantageous Effects

According to the automatic-manual welding apparatus of the present invention, it is possible to realize performance of a welding process in an automatic input mode, in which the entire process of welding an object to be welded is automatically performed, or performance of a precise welding process in a manual input mode in response to a welding signal that is applied.

BEST MODE

Figure 1:
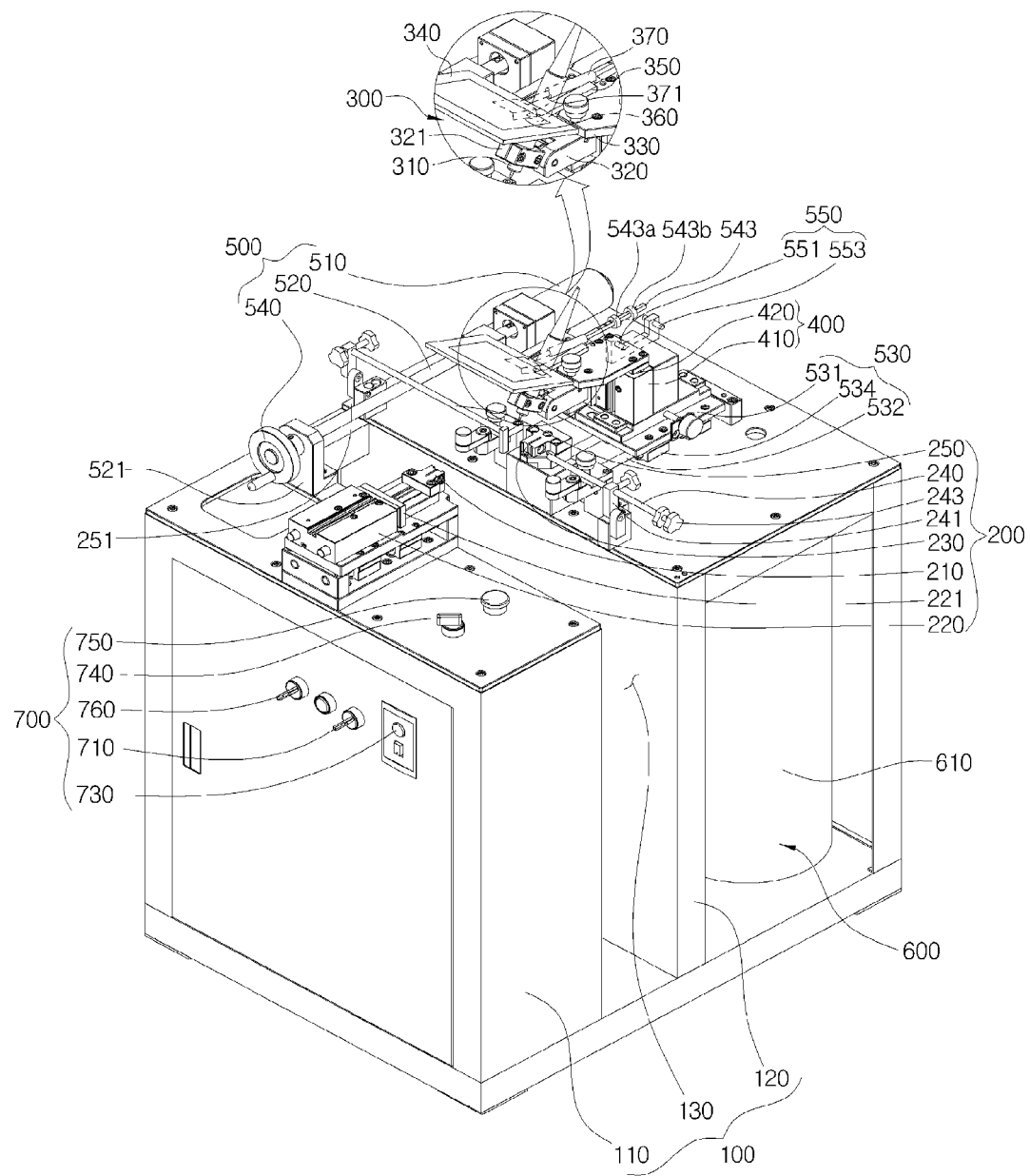
FIG. 1 is a perspective view showing the configuration of an automatic-manual welding apparatus according to an embodiment of the present invention.

Hereinafter, an automatic-manual welding apparatus of the embodiments of the present invention will be described in detail with reference to the accompanying drawings. While the present invention is subject to various modifications and alternative forms, specific embodiments thereof are shown by way of example in the drawings and are explained in detail in the description. However, the present invention should not be construed as being limited to the embodiments set forth herein, but on the contrary, the disclosure is intended to cover all modifications, equivalents, and alternatives falling within the spirit and scope of the present invention. In the drawings, similar elements are denoted by similar reference numerals. In the accompanying drawings, dimensions of structures are exaggerated for the purpose of clarity of the present invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Terms used in the specification are provided for description of the specific embodiments, and the present invention is not limited thereto. The expression of singularity includes a plural meaning unless the singularity expression is explicitly different in context. It will be further understood that terms such as "include" or "have", when used in this specification, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Figure 2:
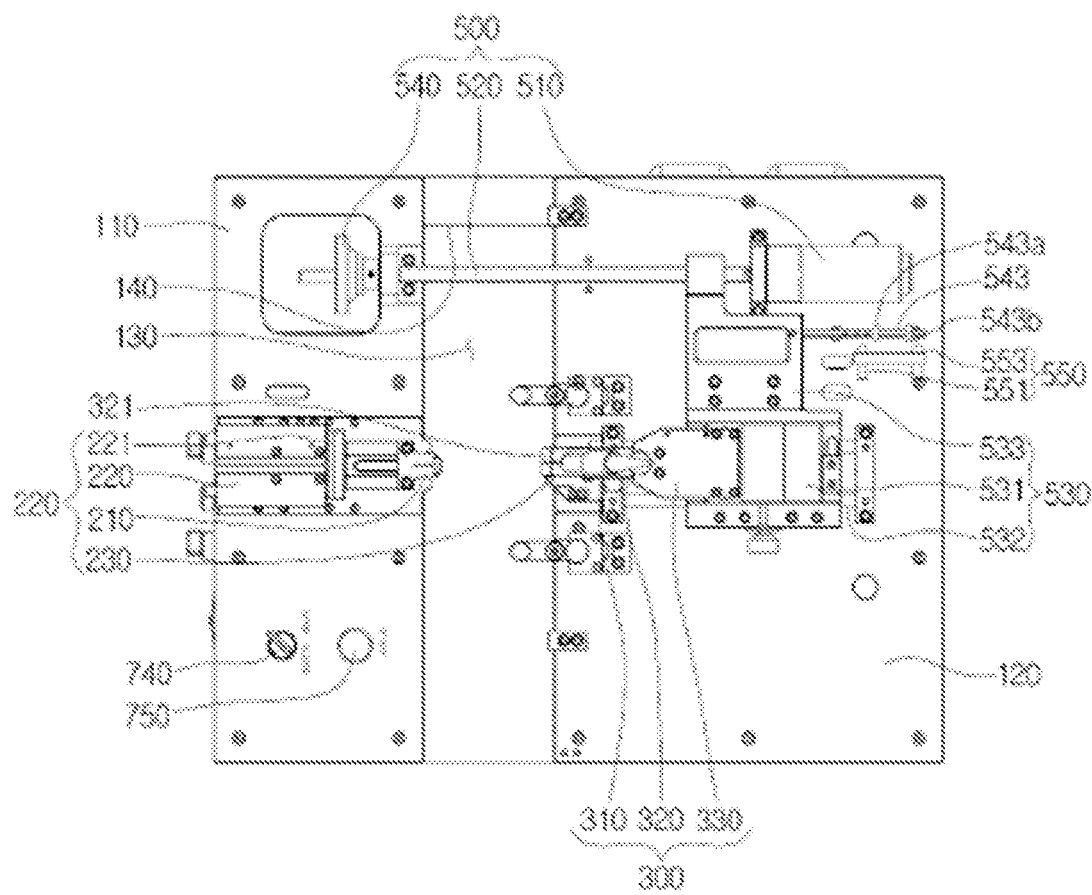
FIG. 2 is a plan view, from which a workpiece-fixing part and a protective cover shown in FIG. 1 are omitted.
Figure 3:
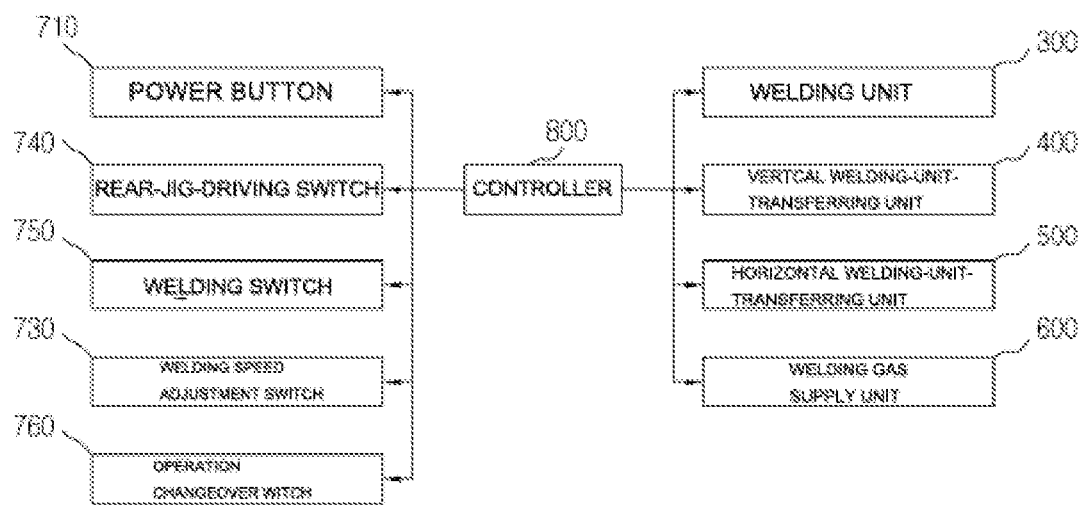
FIG. 3 is a block diagram schematically showing the configuration of the welding apparatus shown in FIG. 1.

FIG. 1 is a perspective view showing the configuration of an automatic-manual welding apparatus according to an embodiment of the present invention, FIG. 2 is a plan view, from which a workpiece-fixing part and a protective cover shown in FIG. 1 are omitted, and FIG. 3 is a block diagram schematically showing the configuration of the welding apparatus shown in FIG. 1.

Referring to FIGS. 1 to 3, an automatic-manual welding apparatus according to an embodiment of the present invention includes a welding table 100, a workpiece-fixing unit 200, a welding unit 300, a vertical welding-unit-transferring unit 400, a horizontal welding-unit-transferring unit 500, a welding gas supply unit 600, an input unit 700, and a controller 800.

The welding table 100 accommodates or supports various components so that welding is performed on an object to be welded. The welding table 100 includes a first table 110 and a second table 120 spaced a predetermined distance apart from each other, with a welding space 130 formed therebetween.

The first table 110 is provided on the top surface thereof with a rear jig 210 of the workpiece-fixing unit 200, which is movable on the top surface of the first table 110 and fixedly supports an object to be welded. The first table 110 is provided on the front surface and the top surface thereof with a plurality of buttons and switches, which constitute the input unit 700.

The second table 120 is provided on the top surface thereof with the welding unit 300, and is further provided on the top surface thereof with the vertical welding-unit-transferring unit 400 and the horizontal welding-unit-transferring unit 500 to transfer the welding unit 300. The second table 120 accommodates a board (not shown) and a power supply line (not shown), which constitute the controller 800, therein.

The first table 110 and the second table 120 are spaced apart from each other so as to define the welding space 130 therebetween. An object to be welded is placed in the welding space 130. The workpiece-fixing unit 200 moves to the vicinity of the welding space 130 in order to support the object to be welded so that the object to be welded is fixed in the welding space 130.

The first table 110 and the second table 120 are coupled to each other via a connection frame.

The workpiece-fixing unit 200 fixes an object to be welded so that the position of the object to be welded is not moved while the welding is in progress. The workpiece-fixing unit 200 includes a rear jig 210, which is provided on the first table 110, a front jig 230, which is provided on the second table 120, and a pair of side jigs 240 and 250, which contact and support the left and right surfaces of the object to be welded.

The rear jig 210 fixes an object to be welded at the rear of the object to be welded with respect to a welding torch 310. The rear jig 210 may be moved forwards or backwards toward the welding space 130 by a rear-jig-transferring part 220. The rear-jig-transferring part 220 may include a rear-jig-transferring cylinder 221, which is driven by pneumatic pressure.

In a welding standby state, the rear-jig-transferring cylinder 221 of the rear-jig-transferring part 220 is shortened and is located at a position that is retracted from the welding space 130. On the other hand, in a welding state, the rear-jig-transferring cylinder 221 of the rear-jig-transferring part 220 is extended so as to move forwards to the welding space 130 and presses the rear side of an object to be welded.

The rear-jig-transferring unit 220 may be formed in a configuration, such as an LM guide, which uses a driving motor, rather than using pneumatic pressure.

The front jig 230 is fixedly coupled to a front-jig-coupling block 231 at the front side of the second table 120, and contacts and supports the front side of an object to be welded. An object to be welded is pressed and fixed between the front jig 230 and the rear jig 210.

The first side jig 240 and the second side jig 250 contact and press the left and right sides of an object to be welded.

The first side jig 240 is provided so as to be adjustable in length, and the second side jig 250 is fixed in position.

The first side jig 240 and the second side jig 250 are fixed in position by side-jig-fixing bars 241 and 251, respectively. The first side jig 240 is provided at one end thereof with a first-side-jig-operating handle 243, which adjusts the position of the first side jig 240 in response to a rotation operation of a worker.

The first-side-jig-fixing bar 241 and the second-side-jig-fixing bar 251 are provided so as to be adjustable in angle with respect to the vertical direction, thereby adjusting the positions at which the pair of side jigs 240 and 250 press the side surfaces of an object to be welded, depending on the thickness of the object to be welded.

The welding unit 300 performs welding on an object to be welded. The welding unit 300 includes a welding torch 310, a torch-fixing head 320 to fix the welding torch 310, a head support part 330 to couple the torch-fixing head 320 to the vertical welding-unit-transferring unit 400, and a protective cover 340 to protect a worker from ultraviolet rays generated during the welding process.

The welding torch 310 is connected to the welding gas supply unit 600 via a gas supply hose and performs welding on an object to be welded using gas supplied from the welding gas supply unit 600.

The torch-fixing head 320 is coupled to the head support part 330 and supports the welding torch 310 and the protective cover 340. The welding torch 310 is inserted into a torch-coupling ring 321 coupled to the torch-fixing head 320, and the torch-coupling ring 321 is coupled to the torch-fixing head 320 so as to be adjustable in angle.

The protective cover 340 is connected to the head support part 330 via a cover-fixing bracket 350. The protective cover 340 is provided so as to be adjustable in angle with respect to the head support part 330. For example, the protective cover 340 may be connected to the cover-fixing bracket 350 via a rotation bracket 360, a lower portion of which is rotatably connected to the cover-fixing bracket 350 and an upper portion of which is connected to the protective cover 340, and a cylinder device 370 may be connected to the head support part 330 and the rotation bracket 360, so that the rotation bracket 360 is rotated by a change in the length of a piston rod 371 of the cylinder device 370 and the angle of the protective cover 340 is therefore adjusted. In this case, when the welding torch 310 descends to weld an object to be welded, the piston rod 371 of the cylinder device 370 is extended such that the protective cover 340 approaches the welding torch 310. When the welding torch 310 ascends away from an object to be welded, the piston rod 371 of the cylinder device 370 is shortened such that the protective cover 340 moves away from the welding torch 310.

When a welding signal is applied, the vertical welding-unit-transferring unit 400 moves the head support part 330 of the welding unit 300 downwards such that the welding torch 310 comes into contact with a welding start point of an object to be welded.

The vertical welding-unit-transferring unit 400 includes a vertical transfer block 410, which is provided under the head support part 330, and a vertical transfer cylinder 420, which is mounted in the vertical transfer block 410 so as to be movable vertically using pneumatic pressure or hydraulic pressure. In one example, the vertical transfer cylinder 420 may be configured so as to be movable vertically using pneumatic pressure. When the vertical transfer cylinder 420 ascends, the head support part 330 is moved upwards, and the welding unit 300 enters a welding standby state. When the vertical transfer cylinder 420 descends, the head support part 330 is moved downwards, and the wending unit 300 enters a welding state.

The horizontal welding-unit-transferring unit 500 includes a forward/backward transfer motor 510, a forward/backward transfer screw 520, a forward/backward transfer screw support block 521, a forward/backward welding-unit-transferring guide 530, and a manual operation handle 540.

The forward/backward transfer motor 510 is configured to be rotatable in forward and reverse directions.

The forward/backward transfer screw 520 includes a first end portion and a second end portion. The first end portion of the forward/backward transfer screw 520 is coupled to the forward/backward transfer motor 510 so as to be rotated in forward and reverse directions together with the forward/backward transfer motor 510.

The forward/backward transfer screw support block 521 rotatably supports the forward/backward transfer screw 520. To this end, the forward/backward transfer screw support block 521 is provided in a plural number, and is disposed on each of the first table 110 and the second table 120.

The forward/backward welding-unit-transferring guide 530 is connected to the forward/backward transfer screw 520 and the vertical welding-unit-transferring unit 400 and moves the welding unit 300 forwards and backwards in accordance with the rotation of the forward/backward transfer screw 520 in forward and reverse directions. For example, the forward/backward welding-unit-transferring guide 530 may include a forward/backward transfer block 531, a forward/backward guide shaft 532, and a screw-driven block 533.

The forward/backward transfer block 531 is integrally coupled to a lower portion of the vertical transfer block 410 and is moved along the forward/backward guide shaft 532 by the driving force of the forward/backward transfer motor 510 and the forward/backward transfer screw 520.

The forward/backward guide shaft 532 guides the linear movement of the forward/backward transfer block 531. The forward/backward guide shaft 532 may be disposed under the forward/backward transfer block 531, and may be connected to the forward/backward transfer block 531 via a shaft-coupling ring 534.

The screw-driven block 533 is connected to the forward/backward transfer screw 520 and the forward/backward transfer block 531 in the state of being disposed therebetween and moves forwards and backwards in the longitudinal direction of the forward/backward transfer screw 520 in accordance with the rotation of the forward/backward transfer screw 520 in forward and reverse directions.

The manual operation handle 540 may be coupled to the second end portion of the forward/backward transfer screw 520 to manually rotate the forward/backward transfer screw 520. The manual operation handle 540 may be operated to rotate the forward/backward transfer screw 520 in forward and reverse directions in the state in which no power is supplied to the forward/backward transfer motor 510.

Meanwhile, a moving distance adjustment shaft 543 extends a predetermined distance from the rear side of the screw-driven block 533. The moving distance adjustment shaft 543 is provided with a front limit sensor 543a and a rear limit sensor 543b, which are spaced apart from each other.

The moving distance adjustment shaft 543 is moved forwards and backwards together with the screw-driven block 533, and adjusts the forward moving distance, the direction switching, and the backward moving distance of the screw-driven block 533 in cooperation with a forward/backward moving distance adjustment part 550.

The forward/backward moving distance adjustment part 550 is provided parallel to the moving distance adjustment shaft 543 on the top surface of the second table 120. The forward/backward moving distance adjustment part 550 is provided with a front limit switch 551 and a rear limit switch 553, which sense the position of the front limit sensor 543a and the position of the rear limit sensor 543b, respectively, when the screw-driven block 533 moves forwards and backwards.

In the standby state, the forward/backward transfer motor 510 rotates in the reverse direction, and the screw-driven block 533 moves backwards to the rear side of the second table 120. At this time, the forward/backward transfer motor 510 is driven until the rear limit sensor 543b of the moving distance adjustment shaft 543 is aligned with the rear limit switch 553.

When a welding signal is applied in this state, the forward/backward transfer motor 510 rotates in the forward direction, and the screw-driven block 533 moves forwards to the front side of the second table 120. At this time, the forward/backward transfer motor 510 rotates in the forward direction so that the screw-driven block 533 moves forwards to a position at which the front limit sensor 543a of the moving distance adjustment shaft 543 is aligned with the front limit switch 551.

The position at which the front limit sensor 543a is aligned with the front limit switch 551 is set to be a welding end position of an object to be welded, and the position at which the rear limit sensor 543b is aligned with the rear limit switch 553 is set to be a welding start position of an object to be welded. When the front limit sensor 543a reaches the front limit switch 551, the controller 800 rotates the forward/backward transfer motor 510 in the reverse direction to control the forward/backward transfer block 510, which supports the welding unit 300, to move backwards.

When the type of the object to be welded is changed, the distance between the front limit switch 551 and the rear limit switch 553 is reset to match the welding distance of the new object to be welded.

The welding gas supply unit 600 supplies a welding gas to the welding torch 310 of the welding unit 300. The welding gas supply unit 600 includes a gas tank 610, a gas valve (not shown), and a pressure gauge (not shown).

The gas tank 610 stores a welding gas therein. The welding gas may be CO2, Ar, or the like.

The upper portion of the gas tank 610 is connected to the welding torch 310 via a gas supply hose. The gas valve is provided at the coupling region between the gas tank 610 and the gas supply hose. The gas valve is opened and closed under the control of the controller 800 so that the welding gas is supplied to the gas supply hose.

The pressure gauge is provided at one side of the gas valve to display the discharge pressure of the welding gas supplied to the gas supply hose.

The input unit 700 receives an input signal associated with driving of the automatic welding apparatus 1 from a worker. The input unit 700 is provided on the front and top surfaces of the first table 110. The input unit 700 includes a power button 710 for receiving power, a rear-jig-driving switch 740 for driving the rear jig 210 of the workpiece-fixing unit 200, a welding speed adjustment switch 730 for adjusting the welding speed of the welding torch 310, a welding switch 750 for applying a welding signal, and an operation changeover switch 760 for switching between the mode of automatically rotating the forward/backward transfer screw 520 and the mode of manually rotating the forward/backward transfer screw 520.

The rear-jig-driving switch 740 drives the rear-jig-transferring part 220 of the rear jig 210. When the rear-jig-driving switch 740 is driven, the rear-jig-transferring cylinder 221 moves forwards to transfer the rear jig 210 to the rear side of an object to be welded.

The welding switch 750 applies a welding signal such that the welding torch 310 moves along an object to be welded and performs welding on the object to be welded. When a worker presses the welding switch 750, the controller 800 controls the respective components such that the welding torch 310 performs welding while moving.

The welding speed adjustment switch 730 may adjust the speed at which the welding torch 310 performs welding while moving along an object to be welded. Depending on the operation of a worker with respect to the welding speed adjustment switch 730, the moving speed of the welding torch 310 becomes faster or slower. The welding speed may be adjusted by the controller 800 controlling the rotating speed of the forward/backward transfer motor 510, which will be described later.

The operation changeover switch 760 is provided to switch between the manual input mode, in which the supply of power to the forward/backward transfer motor 510 is interrupted, and the automatic input mode, in which the supply of power to the forward/backward transfer motor 510 is allowed.

The controller 800 controls the respective components such that the corresponding components operate correctly in response to the input signal input through the input unit 700.

When the power button 710 is pressed or operated by a worker, the controller 800 allows power to be supplied to the respective components from a power supply line connected to a commercial power source. As a result, power is supplied to the rear-jig-transferring part 220, the vertical welding-unit-transferring unit 400, the horizontal welding-unit-transferring unit 500, and the welding gas supply unit 600, which require power.

When a driving signal of the rear-jig-driving switch 740 is applied, the controller 800 drives the rear-jig-transferring unit 220 so that the rear-jig-transferring cylinder 221 moves forwards and the rear jig 210 presses the rear end of an object to be welded.

When the welding is completed and a worker inputs a release signal through the rear-jig-driving switch 740, the controller 800 drives the rear-jig-transferring part 220 so that the rear-jig-transferring cylinder 221 moves backwards and the rear jig 210 releases the pressing force applied to the object to be welded.

When the operation changeover switch 760 is operated and a manual input mode is selected through the operation changeover switch 760, the controller 800 interrupts the supply of power to the forward/backward transfer motor 510, and when an automatic input mode is selected through the operation changeover switch 760, the controller 800 allows the supply of power to the forward/backward transfer motor 510.

When the welding switch 750 is operated in the automatic input mode, the controller 800 sequentially controls the vertical welding-unit-transferring unit 400, the welding gas supply unit 600, and the horizontal welding-unit-transferring unit 500 until a preset point of time at which the welding is finished. Whenever the welding switch 750 is operated once in the manual input mode, the controller 800 sequentially controls the vertical welding-unit-transferring unit 400 and the welding gas supply unit 600.

The controller 800 drives the vertical transfer block 410 of the vertical welding-unit-transferring unit 400 to decrease the height of the vertical transfer cylinder 420. As a result, when the height of the welding unit 300 is decreased and the welding torch 310 is brought into contact with the welding start point of an object to be welded, the controller 800 opens a valve 620 of the welding gas supply unit 600 so that the welding gas is supplied to the welding torch 310. This process is identically performed in the manual input mode and the automatic input mode.

In the automatic input mode, the controller 800 drives the forward/backward transfer motor 510 in the forward direction so that the forward/backward transfer block 510 move forwards. The welding torch 310 performs welding while moving along an object to be welded along with the forward movement of the forward/backward transfer block 510. This process is performed using the manual operation handle 540 in the manual input mode. That is, in the manual input mode, the forward/backward transfer block 531 is moved forwards by rotating the forward/backward transfer screw 520 using the manual operation handle 540.

When the forward/backward transfer block 510 is moved forwards and the front limit sensor 543a of the moving distance adjustment shaft 543 of the screw-driven block 533 is sensed by the front limit switch 551, the controller 800 closes the valve 620 of the welding gas supply unit 600 and terminates welding. Subsequently, the controller 800 drives the forward/backward transfer motor 510 in the reverse direction so that the forward/backward transfer block 510 is moved backwards. When the forward/backward transfer block 510 is moved backwards and the rear limit sensor 543b of the moving distance adjustment shaft 543 of the screw-driven block 533 is sensed by the rear limit switch 553, the controller 800 stops the operation of the forward/backward transfer motor 510.

Subsequently, the controller 800 supplies a working fluid to the vertical transfer block 410 to increase the height of the vertical transfer cylinder 420, and the welding unit 300 returns to the standby state.

In the automatic input mode, the above control flow of the controller 800 is continuously performed by a single operation of a worker operating the welding switch 750. Thus, in the automatic input mode, the welding process may be continuously performed on one object to be welded without intervention on the part of the worker.

Hereinafter, the welding process using the automatic-manual welding apparatus according to the embodiment of the present invention having the configuration described above will be described.

The welding process may be performed in the automatic input mode or in the manual input mode according to the worker's selection through the operation changeover switch 760.

First, in the automatic input mode, the worker operates the power buttons 710 and 720 in order to apply power to the respective components. In the initial standby state, the welding torch 310 is maintained in the state of being moved upwards by the vertical welding-unit-transferring block 410. In the standby state, the horizontal welding-unit-transferring unit 500 is maintained in the state of being moved backwards away from the welding space 130. In this state, the rear limit sensor 543b of the moving distance adjustment shaft 543 of the screw-driven block 533 is aligned with the rear limit switch 553.

The worker brings the front end and one side surface of an object to be welded into close contact with the fixed front jig 230 and the second side jig 250 and grabs the object to be welded with the hand. In this state, the worker drives the rear-jig-driving switch 740. The rear-jig-transferring cylinder 221 is extended in response to the driving of the rear-jig-driving switch 740, and the rear jig 210 is moved forwards and presses the rear end of the object to be welded.

In this state, the worker operates the first-side-jig-operating handle 243 so that the first side jig 240 is brought into close contact with the opposite side surface of the object to be welded and presses the same. As a result, the front, rear, left and right sides of the object to be welded are tightly held and fixed in position.

When the object to be welded is completely fixed, the protective cover 340 is rotated, and the worker drives the welding switch 750. When a welding signal is applied by the operation of the welding switch 750, the controller 800 drives the vertical transfer block 410 of the vertical welding-unit-transferring unit 400 to decrease the height of the vertical transfer cylinder 420. As a result, the height of the welding unit 300 is decreased to a preset minimum height, and the welding torch 310 reaches the welding start point of the object to be welded. In this state, the controller 800 opens the valve 620 of the welding gas supply unit 600 to supply a welding gas to the welding torch 310.

At the same time, the controller 800 drives the forward/backward transfer motor 510 in the forward direction. When the forward/backward transfer screw 520 is rotated in the forward direction by the driving of the forward/backward transfer motor 510, the screw-driven block 533, which is threadedly engaged with the forward/backward transfer screw 520, is moved forwards. When the screw-driven block 533 is moved forwards, the forward/backward transfer block 510, which is fixedly coupled to the screw-driven block 533, is also moved forwards, and the welded unit 300, which is disposed on the forward/backward transfer block 510, is also moved forwards.

While the forward/backward transfer motor 510 is continuously driven in the forward direction, the welding torch 310 performs welding while moving along the top surface of the object to be welded.

When the screw-driven block 533 is moved forwards by the driving of the forward/backward transfer motor 510 in the forward direction and the front limit sensor 543a of the moving distance adjustment shaft 543 is sensed by the front limit switch 551, the controller 800 closes the valve 620 of the welding gas supply unit 600 and terminates welding. At this time, the welding torch 310 is located at the welding end point of the object to be welded.

When a sensing signal is transmitted from the front limit switch 551, the controller 800 drives the forward/backward transfer motor 510 in the reverse direction such that the screw-driven block 533 is moved backwards. Thereby, the welding unit 300 is also moved backwards.

When the screw-driven block 533 is moved backwards and the rear limit sensor 543b of the moving distance adjustment shaft 543 is sensed by the rear limit switch 553, the controller 800 stops driving the forward/backward transfer motor 510.

Subsequently, the controller 800 supplies a working fluid to the vertical transfer block 410 to adjust the height of the vertical transfer cylinder 420 such that the welding unit 300 returns to the standby state.

When the welding unit 300 returns to the standby state, the worker rotates the protective cover 340 upwards and operates the first-side-jig-operating handle 243 to separate the first side jig 240 from the object to be welded. The worker releases the rear-jig-driving switch 740 to separate the rear jig 210 from the object to be welded. Thereafter, the worker removes the object that has completely undergone the welding process from the automatic welding apparatus 1.

In the manual input mode, when the worker rotates the manual operation handle 540 to rotate the forward/backward transfer screw 520 in the forward direction, the screw-driven block 533 is moved forwards. At this time, the distance that the screw-driven block 533 moves varies depends on the degree to which the manual operation handle 540 is rotated. That is, in the manual input mode, the worker rotates the manual operation handle 540 to move the screw-driven block 533 such that the welding torch 310 reaches the welding start point of the object to be welded.

Subsequently, the worker drives the welding switch 750 such that the welding torch 310 performs welding. In this case, while the worker presses the welding switch 750, the welding process may be performed, and when the worker releases the force of pressing the welding switch 750, the welding torch 310 stops the welding process.

As described above, the automatic-manual welding apparatus according to the embodiment of the present invention may perform the welding process in a manual or automatic manner.

In the automatic input mode, when the worker operates the welding switch, the entire process of welding an object to be welded is automatically performed. The controller automatically moves the welding torch, which is in the standby state, to the welding start position of the object to be welded, supplies a welding gas to the welding torch, and linearly moves the welding torch. When the welding torch is moved to the welding end position of the object to be welded, the controller stops supplying a welding gas to the welding torch, and returns the welding torch to the standby position. Since this entire welding process is performed automatically, no intervention on the part of the worker is required, thereby reducing personnel expenses.

In addition, in the automatic input mode, since the forward and backward movement of the welding torch for welding an object to be welded is performed by the driving of the forward/backward transfer motor, the welding process is performed at a constant speed regardless of the proficiency of the worker. Accordingly, it is possible to realize regular and reliable welding quality.

In addition, in the automatic input mode, since the forward and backward movement of the welding torch and the transfer distance for welding thereof are sensed by the limit switches and thus are automatically controlled, it is possible to increase the speed at which each product is welded.

In addition, in the automatic input mode, when a welding signal is applied, the protective cover is also automatically rotated in conjunction with the position shift of the welding torch, thereby reducing the distance that the worker needs to move.

On the other hand, in the manual input mode, the worker may directly moves the welding torch to the welding position of the object to be welded in order to perform a welding process. Thus, it is possible to realize the welding process at a uniform welding position using the manual operation handle, like the automatic input mode. In addition, the manual input mode facilitates welding a portion of the object to be welded, which is difficult to realize in the automatic input mode, for example, welding a portion of the object to be welded that needs to be supplementarily welded or welding portions of the object to be welded that need to undergo different degrees of welding using the welding torch.

Figure 4:
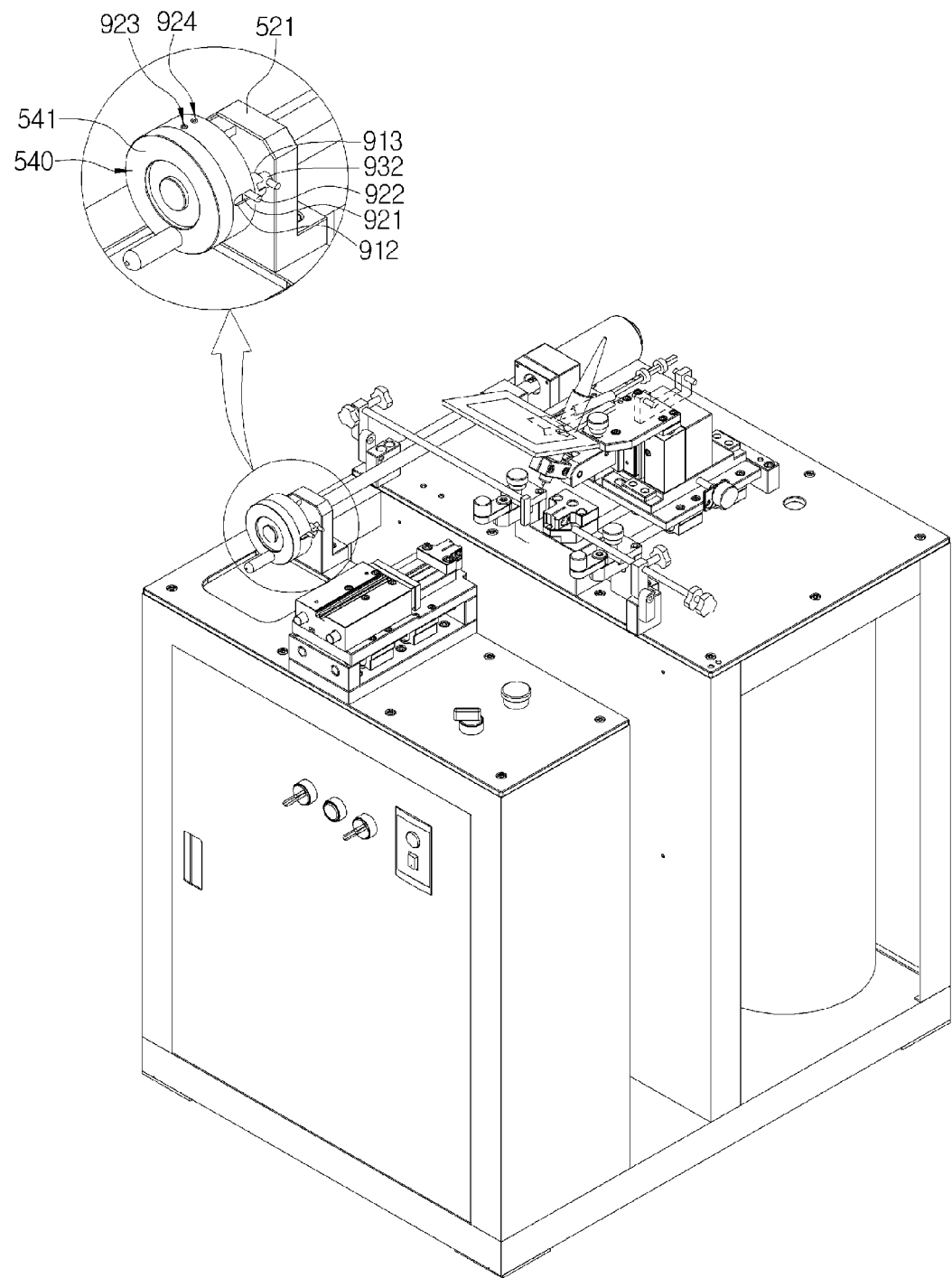
FIG. 4 is a perspective view for explaining an automatic-manual welding apparatus according to another embodiment of the present invention.

Hereinafter, an automatic-manual welding apparatus according to another embodiment of the present invention will be described with reference to FIGS. 4 to 6. The following description will focus on differences from the automatic-manual welding apparatus according to the embodiment of the present invention described above. FIG. 4 is a perspective view for explaining an automatic-manual welding apparatus according to another embodiment of the present invention, FIG. 5 is an enlarged cross-sectional view of a manual operation handle rotation control member shown in FIG. 4, and FIG. 6 is a view showing the front sides of a first rotation control plate and a second rotation control plate shown in FIG. 5.

Figure 5:
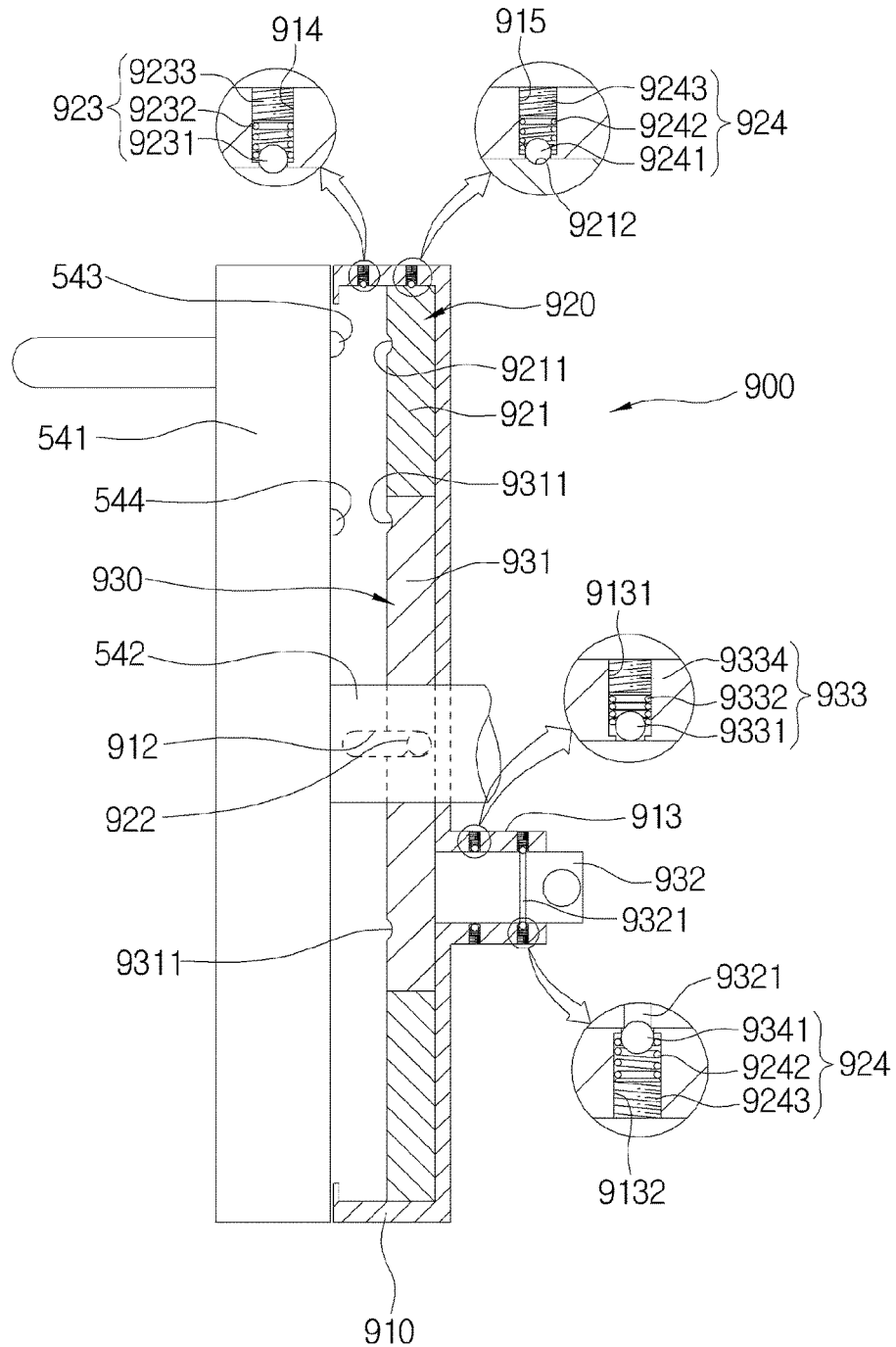
FIG. 5 is an enlarged cross-sectional view of a manual operation handle rotation control member shown in FIG. 4.
Figure 6:
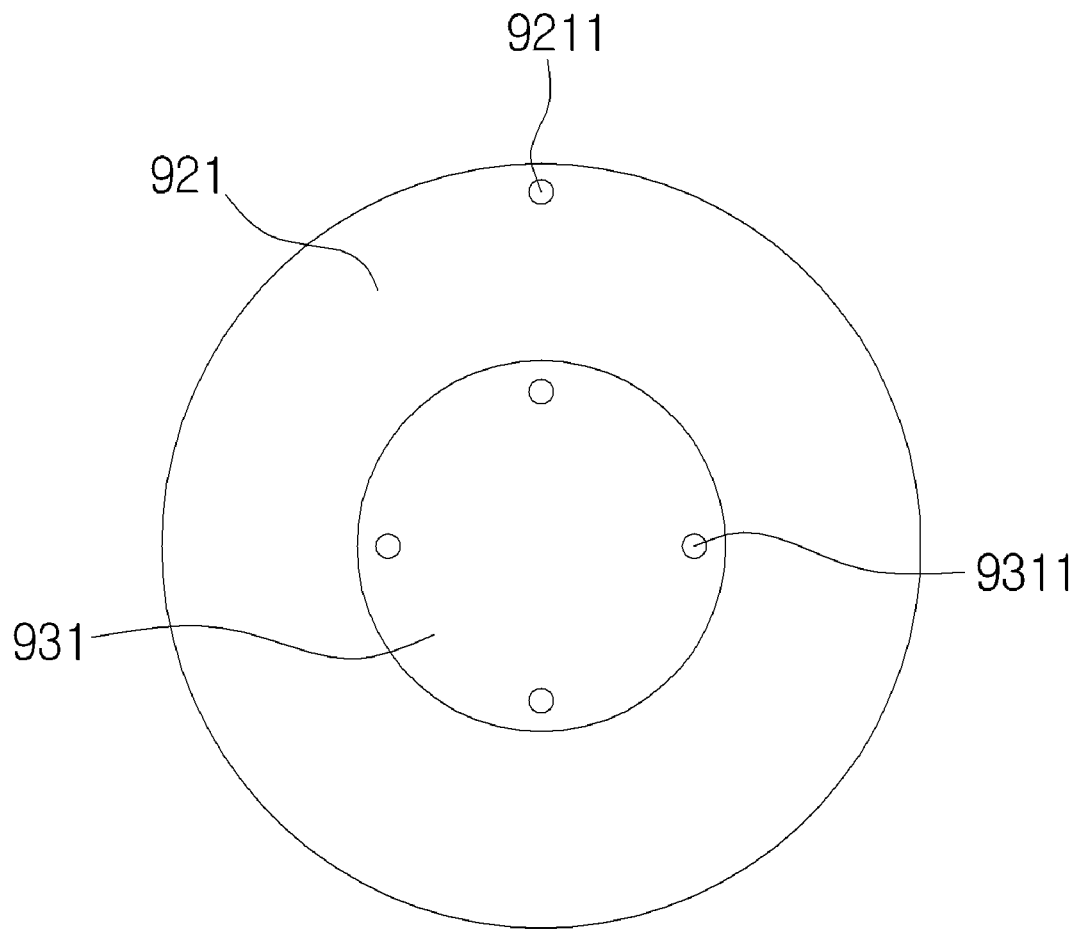
FIG. 6 is a view showing the front sides of a first rotation control plate and a second rotation control plate shown in FIG. 5.

Referring to FIGS. 4 to 6, the automatic-manual welding apparatus according to another embodiment of the present invention is the same as the automatic-manual welding apparatus according to the embodiment of the present invention described above, except that a manual operation handle rotation control member 900 for setting the angle at which the manual operation handle 540 is rotated to move the welding unit 300 forwards and backwards is further included and that the manual operation handle 540 includes a handle part 541, a coupling shaft 542, which extends from the center portion of the handle part 541 and is coupled to the forward/backward transfer screw 520, a first rotation control ball 543, which is provided on the surface of the handle part 541 to which the coupling shaft 542 is connected, and a second rotation control ball 544, which is disposed below the first rotation control ball 543 while being spaced a predetermined distance apart from the first rotation control ball 543. Thus, the following description will focus on the manual operation handle rotation control member 900.

The first rotation control ball 543 is disposed at a position at which the first rotation control ball 543 is received in a first rotation stop control recess 9211 in a first rotation control plate 921, which will be described later, and the second rotation control ball 544 is disposed at a position at which the second rotation control ball 544 is received in a second rotation stop control recess 9311 in a second rotation control plate 931, which will be described later.

The manual operation handle rotation control member 900 includes a rotation control plate case 910, a first rotation control member 920, and a second rotation control member 930.

The rotation control plate case 910 includes an inner space formed therein and an open portion 911 communicating with the inner space. The center portion of the surface of the rotation control plate case 910 that is opposite the open portion 911 is coupled to the coupling shaft 542 of the manual operation handle 540 such that the open portion 911 is opposite the handle part 541 of the manual operation handle 540. The rotation control plate case 910 is fixed to the forward/backward transfer screw support block 521, which is disposed adjacent to the manual operation handle 540.

In addition, the rotation control plate case 910 includes a handle guide slot 921, which is formed in the side surface portion thereof in the depth direction of the inner space therein, and a handle guide cylinder 913, which protrudes from the outer side of one surface thereof that is opposite the open portion 211 so as to extend in the depth direction of the inner space therein, the handle guide cylinder 913 being formed to be hollow.

The first rotation control member 920 is accommodated in the inner space in the rotation control plate case 910. Each time the object to be welded is welded, the manual operation handle 540 is rotated 360 degrees in a forward direction or in a reverse direction. To this end, the first rotation control member 920 may include a first rotation control plate 921, a first control plate handle 922, a plurality of first control plate position fixing members 923, and a plurality of second control plate position fixing members 924.

The first rotation control plate 921 has a ring shape, has a thickness less than or equal to half the depth of the inner space in the rotation control plate case 910, and is accommodated in the inner space in the rotation control plate case 910 so as to be opposite the handle part 541 of the manual operation handle 540. The first rotation control plate 921 may include a first rotation stop control recess 9211, which is formed in the surface thereof that is opposite the handle part 541 and in which the first rotation control ball 543 is received, and a first position fixing recess 9212, which is formed in the peripheral surface thereof defining the thickness thereof. Since the first rotation control plate 921 has a thickness less than or equal to half the depth of the inner space in the rotation control plate case 910, the first rotation control plate 921 may move in the depth direction of the rotation control plate case 910.

The first control plate handle 922 protrudes from the peripheral surface of the first rotation control plate 921 and is fitted into the handle guide slot 921 in the rotation control plate case 910. The first control plate handle 922 is exposed outside the rotation control plate case 910 through the handle guide slot 921, and is operated to move the first rotation control plate 921 in the depth direction of the inner space in the rotation control plate case 910.

The first control plate position fixing members 923 are coupled to two opposite sides of the side surface portion of the rotation control plate case 910. Each of the first control plate position fixing members 923 may include a first position fixing ball 9231, a first spring 9232, and a first spring support bolt 9233. In order to assemble the first position fixing ball 9231, the first spring 9232, and the first spring support bolt 9233 with one another, a first ball-receiving hole 914 may be formed in each of the two opposite sides of the side surface portion of the rotation control plate case 910 so as to communicate with the inner space in the rotation control plate case 910.

Each of the first control plate position fixing members 923 is inserted into the first ball-receiving hole 914. The first position fixing ball 9231 is inserted into the first ball-receiving hole 914 such that a portion thereof protrudes into the inner space in the rotation control plate case 910. The first spring 9232 is disposed on the first position fixing ball 9231, and the first spring support bolt 9233 is screwed into the first ball-receiving hole 914 to press the first spring 9232 toward the first position fixing ball 9231 and to seal the first ball-receiving hole 914 so that the first position fixing ball 9231 and the first spring 9232 are prevented from being separated from the first ball-receiving hole 914. When the first rotation control plate 921 moves close to the handle part 541 of the manual operation handle 540, the first position fixing ball 9231 of each of the first control plate position fixing members 923 is located in the first position fixing recess 9212 and is elastically supported thereby.

The second control plate position fixing members 924 are coupled to the side surface portion of the rotation control plate case 910 so as to be adjacent to the first control plate position fixing members 923. Each of the second control plate position fixing members 924 may include a second position fixing ball 9241, a second spring 9242, and a second spring support bolt 9243. In order to assemble the second position fixing ball 9241, the second spring 9242, and the second spring support bolt 9243 with one another, a second ball-receiving hole 915 may be formed in the rotation control plate case 910 so as to be disposed adjacent to the first ball-receiving hole 914 and to communicate with the inner space in the rotation control plate case 910.

The structure in which the second position fixing ball 9241, the second spring 9242, and the second spring support bolt 9243 are fitted in the second ball-receiving hole 915 is the same as the structure in which the first position fixing ball 9231, the first spring 9232, and the first spring support bolt 9233 are fitted in the first ball-receiving hole 914, and thus a detailed explanation thereof will be omitted.

When the first rotation control plate 921 moves away from the handle part 541, the second position fixing ball 9241 of each of the second control plate position fixing members 924 is located in the first position fixing recess 9212 and is elastically supported thereby.

The second rotation control member 930 is accommodated in the inner space in the rotation control plate case 910. When each welding process is performed on an object to be welded, the manual operation handle 540 is rotated a predetermined angle smaller than 360 degrees in a forward direction or in a reverse direction in the state of dividing 360 degrees into predetermined angular intervals. To this end, the second rotation control member 930 may include a second rotation control plate 931, a second control plate handle 932, a third control plate position fixing member 933, and a fourth control plate position fixing member 934.

The second rotation control plate 931 has a thickness less than or equal to the thickness of the first rotation control plate 921 and a size capable of being accommodated in an annular-shaped inner space in the first rotation control plate 921. The second rotation control plate 931 is accommodated in the inner space in the rotation control plate case 910 so as to be disposed at a position at which the second rotation control plate 931 is capable of moving and passing through the annular-shaped inner space in the first rotation control plate 921. The second rotation control plate 931 includes a plurality of second rotation stop control recesses 9311, which are formed in one surface thereof that is opposite the handle part 541 of the manual operation handle 540 so as to be disposed in the rotating direction of the manual operation handle 540 and receive the second rotation control ball 544 of the manual operation handle 540. The second rotation control plate 931 may be coupled to the coupling shaft 542 of the manual operation handle 540. A bearing may be coupled to the coupling portion between the manual operation handle 540 and the coupling shaft 542 so that the manual operation handle 540 rotates freely.

In one example, the plurality of second rotation stop control recesses 9311 may be disposed in the circumferential direction of the second rotation control plate 931 at the intervals of 45 degrees in the state of dividing 360 degrees into angular intervals of 45 degrees.

The second control plate handle 932 protrudes in a columnar shape from an opposite surface to the surface of the second rotation control plate 931 that faces the handle part 541 of the manual operation handle 540, and passes through the handle guide cylinder 913 so as to be exposed outside the rotation control plate case 910. The second control plate handle 932 includes a second position fixing recess 9321 disposed in the longitudinal direction of the columnar shape, and is operated such that the second rotation control plate 931 is moved in the depth direction of the inner space in the rotation control plate case 910.

The third control plate position fixing member 933 is coupled to one side of the side surface portion of the handle guide cylinder 913 of the rotation control plate case 910. The third control plate position fixing member 933 may include a third position fixing ball 9331, a third spring 9332, and a third spring support bolt 9333. In order to assemble the third position fixing ball 9331, the third spring 9332, and the third spring support bolt 9333 with one another, a third ball-receiving hole 9131 may be formed in the side surface portion of the handle guide cylinder 913 so as to communicate with the inner space in the handle guide cylinder 913.

The structure in which the third position fixing ball 9331, the third spring 9332, and the third spring support bolt 9333 are fitted in the third ball-receiving hole 9131 is the same as the structure in which the first position fixing ball 9231, the first spring 9232, and the first spring support bolt 9233 are fitted in the first ball-receiving hole 914, and thus a detailed explanation thereof will be omitted.

When the second rotation control plate 931 moves close to the handle part 541, the third position fixing ball 9331 of the third control plate position fixing member 933 is located in the second position fixing recess 9321 and is elastically supported thereby.

The fourth control plate position fixing member 934 is coupled to the side surface portion of the handle guide cylinder 913 so as to be adjacent to the third control plate position fixing member 933. The fourth control plate position fixing member 934 may include a fourth position fixing ball 9341, a fourth spring 9342, and a fourth spring support bolt 9343. In order to assemble the fourth position fixing ball 9341, the fourth spring 9342, and the fourth spring support bolt 9343 with one another, a fourth ball-receiving hole 9132 may be formed in the side surface portion of the handle guide cylinder 913 so as to communicate with the inner space in the handle guide cylinder 913.

The structure in which the fourth position fixing ball 9341, the fourth spring 9342, and the fourth spring support bolt 9343 are fitted in the fourth ball-receiving hole 9132 is the same as the structure in which the first position fixing ball 9231, the first spring 9232, and the first spring support bolt 9233 are fitted in the first ball-receiving hole 914, and thus a detailed explanation thereof will be omitted.

When the second rotation control plate 931 moves away from the handle part 541, the fourth position fixing ball 9341 of the fourth control plate position fixing member 934 is located in the second position fixing recess 9321 and is elastically supported thereby.

According to the automatic-manual welding apparatus according to another embodiment of the present invention, in the manual input mode, it is possible to accurately set the welding intervals when rotating the forward/backward transfer screw 520 using the manual operation handle 540. That is, it is possible to set the welding intervals such that the manual operation handle 540 is rotated 360 degrees in each welding process or such that the manual operation handle 540 is rotated an angle smaller than 360 degrees, e.g. 45 degrees, in each welding process.

When it is desired to rotate the manual operation handle 540 360 degrees in each welding process, a worker grabs the first control plate handle 922 and moves the first rotation control plate 921 to the vicinity of the handle part 541 of the manual operation handle 540. At this time, the position to which the first rotation control plate 921 has moved is fixed by the first position fixing ball 9231 coupled to the rotation control plate case 910 being fitted into the first position fixing recess 9212 in the first rotation control plate 921. The first rotation control ball 543 of the manual operation handle 540 is fitted into the first rotation stop control recess 9211 in the first rotation control plate 921, and the second rotation control plate 931 is maintained in the state of being located at a position spaced apart from the handle part 541 of the manual operation handle 540.

In this state, when the worker starts rotating the manual operation handle 540, the first rotation control ball 543 escapes from the first rotation stop control recess 9211, rotates 360 degrees, and then is fitted again into the first rotation stop control recess 9211. Accordingly, the worker is capable of perceiving that the manual operation handle 540 is rotated 360 degrees, and is capable of stopping the manual operation handle 540 after rotating the same exactly 360 degrees.

Subsequently, the worker performs each welding process on an object to be welded by driving the welding switch 750 in the state of stopping the manual operation handle 540 after rotating the same 360 degrees.

When it is desired to rotate the manual operation handle 540 45 degrees in each welding process, the worker holds the first rotation control plate 921 at a position spaced apart from the handle part 541 of the manual operation handle 540. The worker grabs the second control plate handle 932 and moves the second rotation control plate 931 to the vicinity of the handle part 541 of the manual operation handle 540. At this time, the position to which the second rotation control plate 931 has moved is fixed by the third position fixing ball 9331 coupled to the handle guide cylinder 913 being fitted into the second position fixing recess 9321 in the second control plate handle 932. The second rotation control ball 544 of the manual operation handle 540 is fitted into any one of the second rotation stop control recesses 9311 disposed in the circumferential direction of the second rotation control plate 931.

In this state, when the worker starts rotating the manual operation handle 540, the second rotation control ball 544 escapes from one of the second rotation stop control recesses 9311 in which the second rotation control ball 544 has been initially fitted, rotates 45 degrees, and then is fitted into a next one of the second rotation stop control recesses 9311. Accordingly, the worker is capable of perceiving that the manual operation handle 540 is rotated 45 degrees, and is capable of stopping the manual operation handle 540 after rotating the same exactly 45 degrees. The manual operation handle 540 is rotated 45 degrees in each welding process.

Subsequently, the worker performs each welding process on an object to be welded by driving the welding switch 750 in the state of stopping the manual operation handle 540 after rotating the same 45 degrees.

Meanwhile, the automatic-manual welding apparatus according to the embodiments of the present invention includes an anti-corrosion coating layer formed on the surface of the forward/backward transfer screw 520. The anti-corrosion coating layer serves to prevent corrosion of the surface of the forward/backward transfer screw 520. The coating material of the anti-corrosion coating layer includes 20% by weight of tolytriazole, 15% by weight of benzimidazole, 10% by weight of trioctylamine, 15% by weight of hafnium, and 40% by weight of aluminum oxide, and the coating thickness thereof is 8 µm.

Tolytriazole, benzimidazole, and trioctylamine serve to prevent corrosion and discoloration.

Hafnium is a corrosion-resistant transition metal element that exhibits excellent water resistance and corrosion resistance.

Aluminum oxide is added for the purpose of fire resistance, chemical stability, etc.

The reason for restricting the numerical values of the composition ratios of the ingredients and the coating thickness as described above is to obtain the optimum corrosion prevention effect, which was demonstrated through repeated experimentation performed by the present inventor and the analysis results thereof.

Meanwhile, the first side jig 240 and the second side jig 250 of the automatic-manual welding apparatus according to the embodiments of the present invention may be made of a metal material, and an anti-contamination coating layer may be formed on the outer surfaces of the first side jig 240 and the second side jig 250 by applying an anti-contamination composition thereon in order to effectively prevent attachment of a contaminant and remove the contaminant.

The anti-contamination composition may include alkanolamide and amphopropionate in a molar ratio of 1:0.01 to 1:2, and the content of alkanolamide and amphopropionate may be 1 to 10% by weight based on the total weight of the aqueous solution.

As described above, alkanolamide and amphopropionate are preferably present in a molar ratio of 1:0.01 to 1:2. If the molar ratio falls outside of this range, the coating property of the composition on the base material is deteriorated, or moisture adsorption to the surface thereof after coating increases, which eliminates the coating film.

As described above, the content of alkanolamide and amphopropionate is preferably 1 to 10% by weight based on the total weight of the aqueous solution. If the content thereof is less than 1% by weight, the coating property of the composition on the base material is deteriorated, and if the content thereof exceeds 10% by weight, the thickness of the coating film increases, and crystal precipitation easily occurs.

Meanwhile, it is preferable to apply the anti-contamination composition onto a base material using a spray method. In addition, the final thickness of the coating film on the base material is preferably 500 to 2000 Å, and more preferably 1000 to 2000 Å. If the thickness of the coating film is less than 500 Å, the coating film is degraded in the process of high-temperature heat treatment, and if the thickness of the coating film exceeds 2000 Å, crystal precipitation easily occurs on the coated surface.

In addition, the anti-contamination composition may be manufactured by adding 0.1 mol of alkanolamide and 0.05 mol of amphopropionate to 1000 ml of distilled water and stirring these ingredients.

The description of the presented exemplary embodiments is provided so that those skilled in the art to which the present invention pertains use or implement the present invention. Various modifications of the exemplary embodiments will be apparent to those skilled in the art, and general principles defined herein can be applied to other exemplary embodiments without departing from the scope of the present invention. Therefore, the present invention is not limited to the exemplary embodiments presented herein, but should be analyzed within the widest range that is coherent with the principles and new features presented herein.

The invention claimed is:

1. An automatic-manual welding apparatus comprising:
   a welding table comprising a first table and a second table spaced a predetermined distance apart from each other, with a welding space formed therebetween;
   a workpiece-fixing unit movably provided at the first table and the second table, the workpiece-fixing unit being configured to fix an object to be welded;
   a welding unit provided at the second table, the welding unit comprising a welding torch configured to weld the object to be welded fixed by the workpiece-fixing unit;
   a vertical welding-unit-transferring unit configured to move the welding unit in a vertical direction with respect to a top surface of the second table;
   a horizontal welding-unit-transferring unit provided on the top surface of the second table, the horizontal welding-unit-transferring unit being configured to move the vertical welding-unit-transferring unit in a forward-and-backward direction with respect to the welding space;
   a welding gas supply unit configured to supply a welding gas to the welding torch;
   an input unit configured to selectively receive a power supply signal, a driving signal, and a welding signal associated with the workpiece-fixing unit, the welding unit, the vertical welding-unit-transferring unit, the horizontal welding-unit-transferring unit, and the welding gas supply unit; and
   a controller configured to, upon receiving the welding signal from the input unit, control the welding unit, the vertical welding-unit-transferring unit, the welding gas supply unit, and the horizontal welding-unit-transferring unit such that the welding torch welds the object to be welded while moving a predetermined welding distance forwards and backwards,
   wherein the horizontal welding-unit-transferring unit comprises:
   a forward/backward transfer motor configured to be rotatable in forward and reverse directions;
   a forward/backward transfer screw coupled at a first end portion thereof to the forward/backward transfer motor, the forward/backward transfer screw being configured to be rotated in the forward and reverse directions together with the forward/backward transfer motor;
   a forward/backward transfer screw support block configured to rotatably support the forward/backward transfer screw;
   a forward/backward welding-unit-transferring guide connected to the forward/backward transfer screw and the vertical welding-unit-transferring unit, the forward/backward welding-unit-transferring guide being configured to move the welding unit forwards and backwards in accordance with rotation of the forward/backward transfer screw in the forward and reverse directions; and
   a manual operation handle coupled to a second end portion of the forward/backward transfer screw, the manual operation handle being configured to manually rotate the forward/backward transfer screw,
   wherein the input unit comprises an operation changeover switch configured to switch between a manual input mode, in which supply of power to the forward/backward transfer motor is interrupted, and an automatic input mode, in which supply of power to the forward/backward transfer motor is allowed, the operation changeover switch switching between a mode of automatically rotating the forward/backward transfer screw and a mode of manually rotating the forward/backward transfer screw, and
   wherein the controller controls the forward/backward transfer motor such that when the manual input mode is selected through the operation changeover switch, supply of power to the forward/backward transfer motor is interrupted and such that when the automatic input mode is selected through the operation changeover switch, supply of power to the forward/backward transfer motor is allowed,
   wherein the apparatus further comprises:

a manual operation handle rotation control member configured to set an angle at which the manual operation handle is rotated to move the welding unit forwards and backwards, wherein the manual operation handle comprises a handle part, a coupling shaft extending from a center portion of the handle part, the coupling shaft being coupled to the forward/backward transfer screw, a first rotation control ball provided on a surface of the handle part to which the coupling shaft is connected, and a second rotation control ball disposed below the first rotation control ball while being spaced a predetermined distance apart from the first rotation control ball, and wherein the manual operation handle rotation control member comprises:

a rotation control plate case having an inner space formed therein, the rotation control plate case comprising an open portion communicating with the inner space, a center portion of a surface of the rotation control plate case that is opposite to the open portion being coupled to the coupling shaft such that the open portion is opposite to the handle part;

a first rotation control member accommodated in the inner space in the rotation control plate case, the first rotation control member being configured to rotate the manual operation handle 360 degrees in a forward direction or in a reverse direction when each welding process is performed on the object to be welded; and a second rotation control member accommodated in the inner space in the rotation control plate case, the second rotation control member being configured to rotate the manual operation handle a predetermined angle smaller than 360 degrees in a forward direction or in a reverse direction in a state of dividing 360 degrees into predetermined angular intervals when each welding process is performed on the object to be welded.

2. The automatic-manual welding apparatus according to claim 1, wherein the rotation control plate case comprises a handle guide slot formed in a side surface portion thereof in a depth direction of the inner space therein and a handle guide cylinder protruding from an outer side of a surface thereof that is opposite to the open portion, the handle guide cylinder extending in the depth direction of the inner space therein, the handle guide cylinder being formed to be hollow, wherein the first rotation control member comprises:

a first rotation control plate having a ring shape and a thickness less than or equal to half a depth of the inner space in the rotation control plate case, the first rotation control plate being accommodated in the inner space in the rotation control plate case, the first rotation control plate comprising a first rotation stop control recess formed in a surface thereof that is opposite to the handle part to allow the first rotation control ball to be received therein and a first position fixing recess formed in a peripheral surface thereof defining the thickness thereof;

a first control plate handle protruding from the peripheral surface of the first rotation control plate to be fitted into the handle guide slot, the first control plate handle being exposed outside the rotation control plate case through the handle guide slot, the first control plate handle being operated to move the first rotation control plate in the depth direction of the inner space in the rotation control plate case;

a plurality of first control plate position fixing members coupled to two opposite sides of a side surface portion of the rotation control plate case, each of the first control plate position fixing members comprising a first position fixing ball partially protruding into the inner space in the rotation control plate case, the first position fixing ball being located in the first position fixing recess and elastically supported thereby when the first rotation control plate moves closer to the handle part; and a plurality of second control plate position fixing members coupled to the side surface portion of the rotation control plate case so as to be adjacent to the first control plate position fixing members, each of the second control plate position fixing members comprising a second position fixing ball partially protruding into the inner space in the rotation control plate case, the second position fixing ball being located in the first position fixing recess and elastically supported thereby when the first rotation control plate moves away from the handle part, and wherein the second rotation control member comprises:

a second rotation control plate having a thickness less than or equal to the thickness of the first rotation control plate and a size accommodated in an annular-shaped inner space in the first rotation control plate, the second rotation control plate being accommodated in the inner space in the rotation control plate case so as to be disposed at a position at which the second rotation control plate moves and passes through the annular-shaped inner space in the first rotation control plate, the second rotation control plate comprising a plurality of second rotation stop control recesses formed in a surface thereof that is opposite to the handle part so as to be disposed in a rotating direction of the manual operation handle and to allow the second rotation control ball to be received therein;

a second control plate handle protruding in a columnar shape from an opposite surface to a surface of the second rotation control plate that faces the handle part and passing through the handle guide cylinder so as to be exposed outside the rotation control plate case, the second control plate handle comprising a second position fixing recess disposed in a longitudinal direction of the columnar shape, the second control plate handle being operated such that the second rotation control plate is moved in the depth direction of the inner space in the rotation control plate case;

a third control plate position fixing member coupled to one side of a side surface portion of the handle guide cylinder, the third control plate position fixing member comprising a third position fixing ball partially protruding into an inner space in the handle guide cylinder, the third position fixing ball being located in the second position fixing recess and elastically supported thereby when the second rotation control plate moves close to the handle part; and a fourth control plate position fixing member coupled to the side surface portion of the handle guide cylinder so as to be adjacent to the third control plate position fixing member, the fourth control plate position fixing member comprising a fourth position fixing ball partially protruding into the inner space in the handle guide cylinder, the fourth position fixing ball being located in the second position fixing recess and elastically supported thereby when the second rotation control plate moves away from the handle part.

* * * * *